United States Patent
Henne et al.

(10) Patent No.: US 8,505,922 B2
(45) Date of Patent: Aug. 13, 2013

(54) BI-METAL SPIRAL WOUND GASKET

(75) Inventors: Joseph Henne, Birmingham, MI (US);
Marcin Fracz, Waterford, MI (US);
Thomas O. Zurfluh, Evanston, IL (US)

(73) Assignee: Federal-Mogul Corporation,
Southfield, MI (US)

( * ) Notice: Subject to any disclaimer, the term of this patent is extended or adjusted under 35 U.S.C. 154(b) by 516 days.

(21) Appl. No.: 12/856,950

(22) Filed: Aug. 16, 2010

(65) Prior Publication Data
US 2012/0038114 A1    Feb. 16, 2012

(51) Int. Cl.
*F16J 15/02* (2006.01)

(52) U.S. Cl.
USPC ................ 277/312; 277/610; 277/633

(58) Field of Classification Search
USPC .................. 277/312, 316, 610, 633
See application file for complete search history.

(56) References Cited

U.S. PATENT DOCUMENTS

| | | | | |
|---|---|---|---|---|
| 535,713 A * | 3/1895 | Michalk | | 277/633 |
| 2,259,609 A * | 10/1941 | Boyd | | 277/633 |
| 2,457,694 A * | 12/1948 | Lippincott | | 277/610 |
| 2,882,083 A * | 4/1959 | Palumbo et al. | | 277/610 |
| 2,940,168 A * | 6/1960 | Monroe | | 29/419.1 |
| 3,132,870 A * | 5/1964 | Pschera | | 277/610 |
| 3,905,090 A * | 9/1975 | Painter | | 228/164 |
| 4,019,244 A * | 4/1977 | Owen et al. | | 29/520 |
| 4,127,277 A * | 11/1978 | Owen et al. | | 277/633 |
| 4,189,819 A * | 2/1980 | Nicholson | | 29/417 |
| 4,477,094 A | 10/1984 | Yamamoto et al. | | |
| 4,529,662 A | 7/1985 | Lancaster et al. | | |
| 4,673,187 A * | 6/1987 | Hanson et al. | | 277/314 |
| 5,082,296 A * | 1/1992 | Aizawa et al. | | 277/610 |
| 5,308,090 A * | 5/1994 | Hamada et al. | | 277/610 |
| 5,411,274 A * | 5/1995 | Yahagi et al. | | 277/626 |
| 5,511,797 A * | 4/1996 | Nikirk et al. | | 277/609 |
| 5,527,047 A * | 6/1996 | Waterland, III | | 277/610 |
| 5,664,791 A * | 9/1997 | Owen | | 277/609 |
| 5,683,091 A * | 11/1997 | Isoe et al. | | 277/610 |
| 5,722,637 A * | 3/1998 | Faramarzi et al. | | 251/190 |
| 5,823,542 A * | 10/1998 | Owen | | 277/603 |
| 5,913,522 A * | 6/1999 | Koch | | 277/610 |
| 5,964,468 A | 10/1999 | Chester et al. | | |
| 5,997,007 A * | 12/1999 | Hanashima et al. | | 277/610 |
| 6,250,646 B1 * | 6/2001 | Chang | | 277/603 |

(Continued)

FOREIGN PATENT DOCUMENTS
JP         1224571        9/1989

*Primary Examiner* — Vishal Patel
*Assistant Examiner* — L. Susmitha Koneru
(74) *Attorney, Agent, or Firm* — Robert L. Stearns; Dickinson Wright, PLLC

(57) ABSTRACT

A spiral wound gasket (20) is disposed between joint members (22, 24) of a hot fluid joint to seal a gap (48) therebetween. The spiral wound gasket (20) includes a first high temperature performance metallic strip (28) formed of a thermally conductive alloy, including, Ni Cr, and Fe, spirally wound around a central axis (A) to present a first high temperature performance metallic winding (30) exposed to hot fluids. A first non-metallic filler strip (32) formed of a mica material is spirally wound outwardly of the first high temperature performance metallic winding (30) to form a first non-metallic filler winding (34). A second high temperature performance metallic strip (36) formed of a stainless steel material is spirally wound outwardly of the first non-metallic filler winding (34). A second non-metallic filler strip (40) formed of a graphite material is spirally wound outwardly of the second high temperature performance metallic winding (38).

32 Claims, 6 Drawing Sheets

(56) References Cited

U.S. PATENT DOCUMENTS

| | | | |
|---|---|---|---|
| 6,708,983 B2* | 3/2004 | Reisel et al. | 277/592 |
| 6,926,285 B1* | 8/2005 | Suggs et al. | 277/610 |
| 7,204,492 B2* | 4/2007 | Hoyes et al. | 277/610 |
| 2005/0006858 A1 | 1/2005 | Hoyes et al. | |
| 2005/0225037 A1* | 10/2005 | Dove | 277/610 |
| 2007/0176373 A1 | 8/2007 | Suggs et al. | |
| 2009/0115139 A1* | 5/2009 | Jenkins et al. | 277/610 |
| 2010/0181729 A1* | 7/2010 | Slay et al. | 277/336 |
| 2012/0068415 A1* | 3/2012 | Deluca et al. | 277/312 |

\* cited by examiner

BI-METAL SPIRAL WOUND GASKET

BACKGROUND OF THE INVENTION

1. Field of the Invention

This invention relates to spiral wound gaskets, and in particular to spiral wound gaskets for sealing high temperature fluid joints.

2. Description of the Prior Art

Spiral wound gaskets typically include a combination of alternating metal strips and sealing material each profiled longitudinally to provide controlled axial compression. An example of such a spiral wound gasket is disclosed in U.S. Pat. No. 6,708,983 to Reisel et. al. and assigned to Federal-Mogul World Wide, Inc. The wound spiral gasket of the '983 patent includes a plurality of graphite windings interposed between metal windings.

Spiral wound gaskets are typically used to seal a gap between fluid joint members surrounding a chamber or fluid conduit in an internal combustion engine or other hot fluid application. The spiral wound gasket prevents the hot fluids flowing through the chamber or conduit from escaping through the gap. One of the fluid joint members typically includes a U-shaped groove for containing the spiral wound gasket, as shown in FIG. 11, because direct exposure to the hot fluids of the conduit or chamber causes an undesirable loss in strength and sealing capability of the spiral wound gasket longitudinal metallic members. The inner diameter wall of the groove protects the spiral wound gasket from the hot fluids to sustain strength and sealing capability of the spiral wound gasket.

SUMMARY OF THE INVENTION AND ADVANTAGES

A spiral wound gasket includes a first high temperature performance metallic strip formed of a thermally conductive alloy including, in wt % of the alloy, nickel (Ni) in an amount of about 18.0 wt % to about 55.0 wt %; chromium (Cr) in an amount of about 13.5 wt % to about 23.0 wt %; and a balance of iron (Fe). The first high temperature performance metallic strip is wound around a central axis to present a first high temperature performance metallic winding. A first non-metallic filler strip formed of a first non-metallic insulating material is disposed outwardly of the first high temperature performance metallic winding and wound around the central axis to present a first non-metallic filler winding. A second high temperature performance metallic strip formed of a stainless steel material is disposed outwardly of the first non-metallic filler winding and wound around the central axis to present a second high temperature performance metallic winding. A second non-metallic filler strip formed of a second non-metallic insulating material is disposed outwardly of the second high temperature performance metallic winding and wound around the central axis to present a second non-metallic filler winding.

A method of forming the spiral wound gasket includes winding a first high temperature performance metallic strip formed of a thermally conductive alloy including, in wt % of the alloy, nickel (Ni) in an amount of about 18.0 wt % to about 55.0 wt %; chromium (Cr) in an amount of about 13.5 wt % to about 23.0 wt %; and a balance of iron (Fe) spirally around a central axis to present a first high temperature performance metallic winding. The method also includes winding a first non-metallic filler strip spirally around the central axis outwardly of the first high temperature performance metallic winding to form a first non-metallic filler winding; winding a second high temperature performance metallic strip formed of a stainless steel material around the central axis outwardly of the first non-metallic filler winding to form a second high temperature performance metallic winding; and winding a second non-metallic filler strip formed of a second non-metallic insulating material spirally around the central axis outwardly of the second high temperature performance metallic winding.

The spiral wound gasket provides excellent longitudinal flexibility and sealing capability along a cylindrical body, for example between fluid joint members, compared to the spiral wound gaskets of the prior art. The spiral wound gasket also provides lower manufacturing costs of the fluid joint members. The first high temperature performance metallic strip and first non-metallic filler strip protects the second high temperature performance metallic strip and second non-metallic filler strip from direct contact with the hot fluids, which degrades the flexibility of the metallic strips of the prior art spiral wound gaskets. In addition, the spiral wound gasket maintains excellent strength and sealing capability when directly exposed to high pressure variations, thermal cycling, and hot fluids at temperatures of about 1000° F. to about 1600° F. It is not necessary to include the U-shaped groove in the fluid joint member for protecting the spiral wound gasket from the hot fluids, so the fluid joint members are less costly to manufacture.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
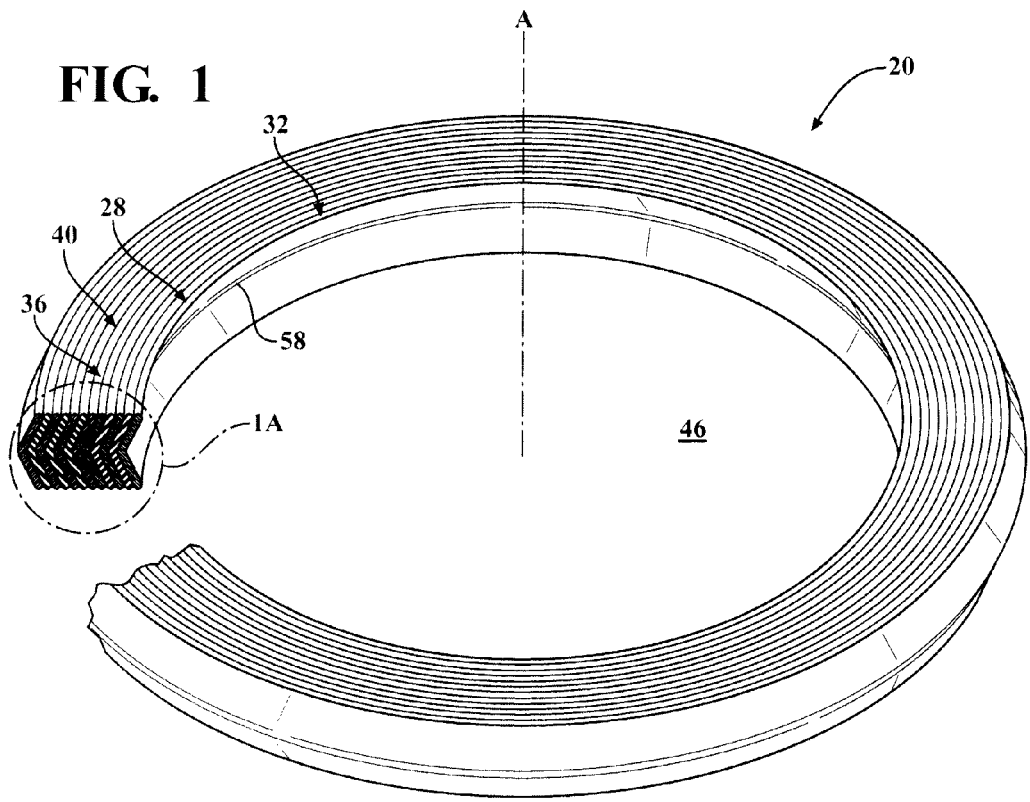
FIG. 1 is a sectional view showing a first embodiment of the spiral wound gasket, partly in perspective and partly in cross section.
Figure 10:
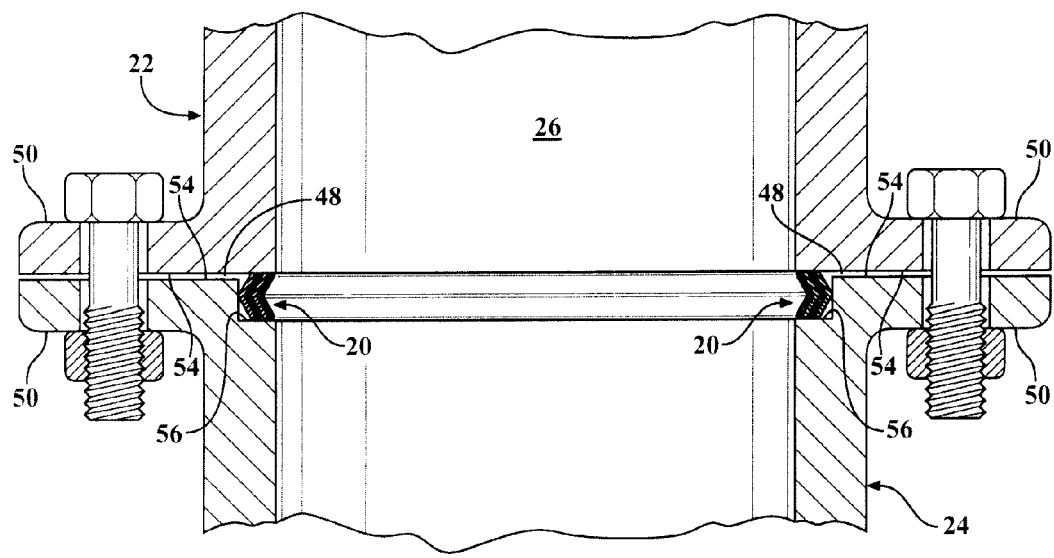
FIG. 10 is a sectional side view of a fluid joint including the spiral wound gasket of FIG. 1.
Figure 11:
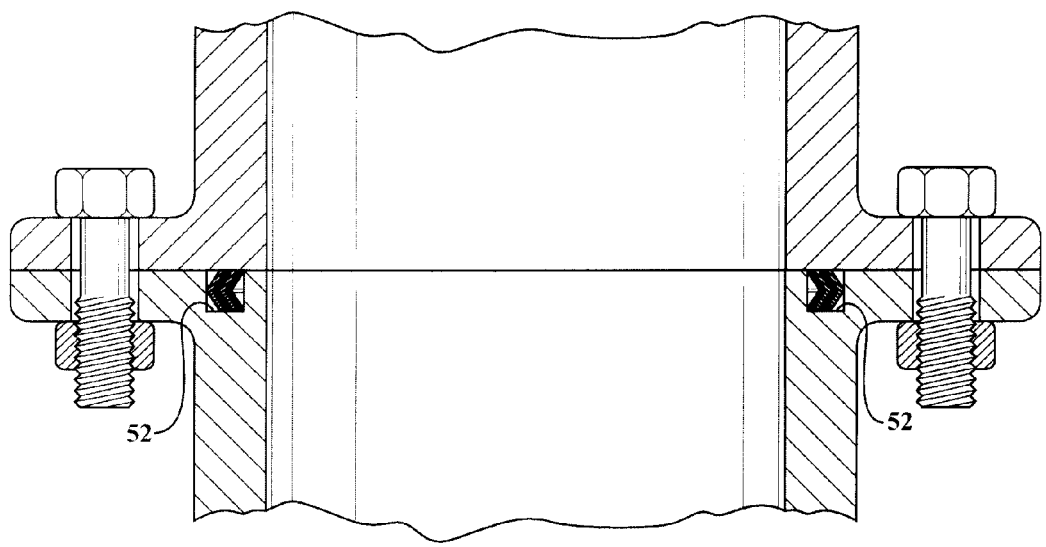
FIG. 11 is a sectional side view of a fluid joint including a spiral wound gasket of the prior art.

Referring to FIGS. 1 and 10, a representative spiral wound gasket 20 for providing a seal between a first joint member 22 and a second joint member 24 of an internal combustion engine is shown. Although not shown, the spiral wound gasket 20 can also seal a conduit, a valve exiting the internal combustion chamber, or other high temperature fluid applications. The joint members 22, 24 and the spiral wound gasket 20 typically extend around a chamber 26 wherein fluids at temperatures of about 1000° F. to about 1600° F. flow therethrough. Alternatively, the spiral wound gasket 20 can surround a metal conduit (not shown). The spiral wound gasket 20 includes a first high temperature performance metallic strip 28 formed of a thermally conductive alloy wound around a central axis A to present a first high temperature performance metallic winding 30; a first non-metallic filler strip 32 formed of a first non-metallic insulating material disposed outwardly of the first high temperature performance metallic winding 30 and wound around the central axis A to present a first non-metallic filler winding 34; a second high temperature performance metallic strip 36 formed of a stainless steel material disposed outwardly of the first non-metallic filler winding 34 and wound around the central axis A to present a second high temperature performance metallic winding 38; and a second non-metallic filler strip 40 formed of a second non-metallic insulating material disposed outwardly of the second high temperature performance metallic winding 38 and wound around the central axis A to present a second non-metallic filler winding 42. A winding is defined as one wrap of at least 360° of the strip around the central axis A, and less than 720° of the strip around the central axis A. A plurality of windings is defined as at least two wraps, or more than 720° of the strip around the central axis A. A partial winding is defined as less than one 360° wrap of the strip around the central axis A.

Figure 1A:
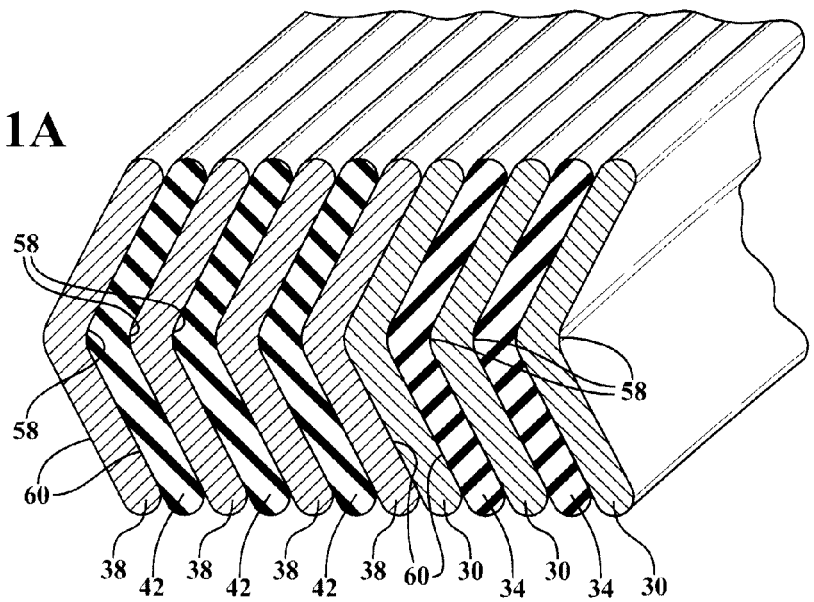
FIG. 1A is an enlarged cross sectional and partial perspective view of the spiral wound gasket of FIG. 1.
Figure 2:
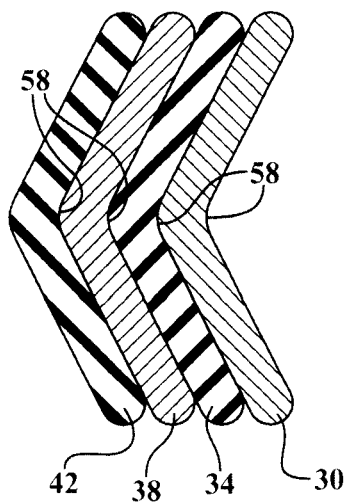
FIG. 2 is an enlarged cross sectional view of a second embodiment of the spiral wound gasket.
Figure 3:
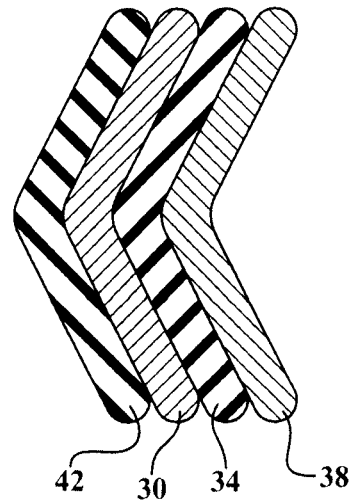
FIG. 3 is an enlarged cross sectional view of a third embodiment of the spiral wound gasket.
Figure 7:
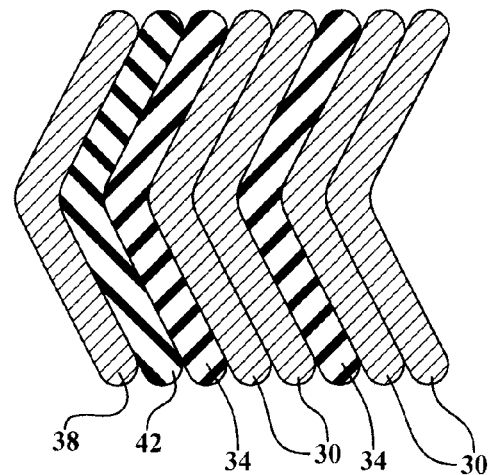
FIG. 7 is an enlarged cross sectional view of a seventh embodiment of the spiral wound gasket.
Figure 12A:
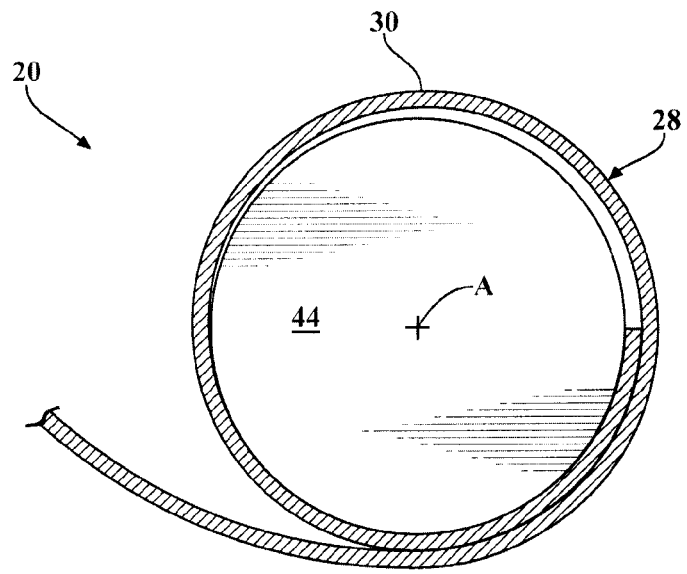
FIGS. 12A-12D are top views of the spiral wound gasket at various steps of a method of forming the spiral wound gasket of FIG. 1.

As shown in FIG. 12A, the spiral wound gasket 20 is typically formed by winding the first high temperature performance metallic strip 28 formed of the thermally conductive alloy spirally around the central axis A to present a first high temperature performance metallic winding 30. The spiral wound gasket 20 may include a single first high temperature performance metallic winding 30, as shown in FIGS. 2 and 3, but typically the first high temperature performance metallic strip 28 is spirally wound around the central axis A several times to present a plurality of the first high temperature performance metallic windings 30, as shown in FIGS. 1 and 1A. The high temperature performance metallic strip 28 can also be spirally wound around itself to present the plurality of the first high temperature performance metallic windings 30, as shown in FIG. 7. A cylindrical mandrel 44 or another object having a central axis A is used to wind the strips 28, 32, 36, 40 around the central axis A, as shown in FIG. 12. The spiral wound gasket 20 is removed from the mandrel 44 so that the strips 28, 32, 36, 40 surround a central opening 46 having the central axis A, as shown in FIG. 1.

The thermally conductive alloy of the first high temperature performance metallic strip 28 includes, in wt % of the alloy, nickel (Ni) in an amount of 18.0 wt % to 55.0 wt %; chromium (Cr) in an amount of 13.5 wt % to 23.0 wt %; and a balance of iron (Fe). The weight percent (wt %) of a component is defined as the concentration of the component or element relative to the total weight of the thermally conductive alloy. For example, if the thermally conductive alloy includes Ni in an amount of 20.0 wt %, then 20.0% of the total weight of the thermally conductive alloy consists of Ni, and the remaining 80.0% of the total weight of the thermally conductive alloy consists of other compounds or elements. The presence and amount of the Ni, Cr, Fe, and other elements or components of the thermally conductive alloy can be detected by a chemical analysis or by viewing an Energy Dispersive Spectra (EDS) of the first high temperature performance metallic strip 28. The EDS. may be generated by a Scanning Electron Microscope (SEM) instrument.

As stated above, the thermally conductive alloy includes, in wt % of the thermally conductive alloy, Ni in an amount of 18.0 wt % to 22.0 wt %. In another embodiment, the thermally conductive alloy includes Ni in an amount of 19.0 wt % to 30.0 wt %. In yet another embodiment the thermally conductive alloy includes Ni in an amount of 22.0 wt % to 28.0 wt %.

As stated above, the thermally conductive alloy includes, in wt % of the thermally conductive alloy, Cr in an amount of 13.5 wt % to 23.0 wt %. In another embodiment, the thermally conductive alloy includes Cr in an amount of 14.0 wt % to 22.0 wt %. In yet another embodiment the thermally conductive alloy includes Cr in an amount of 17.1 wt % to 21.0 wt %.

As stated above, the thermally conductive alloy includes a balance of Fe. In one embodiment, the thermally conductive alloy includes Fe in an amount of 23.0 wt % to 80.0 wt %. In another embodiment, the thermally conductive alloy includes Fe in an amount of 40.0 wt % to 75.0 wt %. In yet another embodiment, the thermally conductive alloy includes Fe in an amount of 50.0 wt % to 70.0 wt %.

In one embodiment, the thermally conductive alloy includes carbon (C) in an amount up to 0.08 wt %; manganese (Mn) in an amount up to 3.0 wt %; and silicon (Si) in an amount up to 1.0 wt %, in addition to the Ni, Cr, and Fe. In another embodiment, the thermally conductive alloy includes at least one of sulfur (S) in an amount up to 0.015 wt %; phosphorous (P) in an amount up to 0.03 wt %; molybdenum (Mo) in an amount of 1.0 wt % to 8.0 wt %; nitrogen (N) in an amount of 0.30 wt % to 0.40 wt %; titanium (Ti) in an amount of up to 2.30 wt %; vanadium (V) in an amount of 0.10 wt % to 0.50 wt %; aluminum (Al) in an amount up to 0.80 wt %; boron (B) in an amount of 0.001 wt % to 0.010 wt %; cobalt (Co) in an amount up to 1.0 wt %; a combination of niobium (Nb) and tantalum (Ta) in an amount of about 4.75 wt % to 5.50 wt %; and copper (Cu) in an amount up to 1.50 wt %. The thermally conductive alloy may include other elements, additives, and impurities.

The composition of the thermally conductive alloy of the first high temperature performance metallic strip 28 may change depending on the temperature and environment in which the spiral wound gasket 20 is used. For applications operating at a temperature of about 1600° F., the thermally conductive alloy typically includes a greater amount of Ni than the thermally conductive alloy for applications operating at 1000° F. In one embodiment, the thermally conductive alloy is typically precipitation hardened by solution annealing at about 1850° F. for about one hour followed by rapid cooling to less than 200° F., then reheated to about 132.5° F. for about 8 hours, then furnace cooled at about 100° F. per hour to about 1150° F., held about 1150° F. for about 8 hours, and then rapidly cooled to less than 200° F. In one embodiment, the thermally conductive alloy includes annealed Inconel© 718, a commercially available product. Table 1 lists five particular embodiments of the thermally conductive alloy, among the many possible embodiments.

TABLE 1

| | Material No. | | | | |
|---|---|---|---|---|---|
| | Example 1 | Example 2 | Example 3 | Example 4 | Inconel © 718 |
| | Application Temp. (° F.) | | | | |
| | 1000 wt % | 1200 wt % | 1400 wt % | 1600 wt % | 1600 wt % |
| C | 0.08 max | 0.020 max | 0.08 max | 0.08 max | 0.08 max |
| Mn | 1.00 max | 3.00 max | 2.00 max | 0.35 max | 0.35 max |
| S | 0.015 max | 0.01 max | | 0.015 max | 0.015 max |
| P | | 0.03 max | | 0.015 max | 0.015 max |
| Si | 1.00 max | 0.50 max | 1.00 max | 0.35 max | 0.35 max |
| Cr | 18.0-22.0 | 20.5-23.0 | 13.5-16.00 | 17.00-21.00 | 17.00-21.00 |
| Ni (*Ni + Co) | 18.0-22.0 | 26.0-28.0 | 24.00-27.00 | 50.00-55.00* | 50.00-55.00* |
| Mo | | 6.50-8.00 | 1.00-1.50 | 2.80-3.30 | 2.80-3.30 |
| N | | 0.30-0.40 | | | |
| Ti | 0.60 max | | 1.90-2.30 | 0.65-1.15 | 0.65-1.15 |
| V | | | 0.10-0.50 | | |
| Al | 0.60 max | | 0.35 max | 0.35-0.80 | 0.35-0.80 |
| B | | | 0.003-0.010 | 0.001-0.006 | 0.001-0.006 |
| Co | | | | 1.00 max | 1.00 max |
| Nb + Ta | | | | 4.75-5.50 | 4.75-5.50 |
| Cu | 0.75 max | 0.50-1.50 | | 0.15 max | 0.15 max |
| Fe | balance | balance | balance | balance | balance |

The first high temperature performance metallic strip 28 formed of the thermally conductive alloy maintains its strength and ability to seal at temperatures of about 1000° F. to about 1600° F., such as when directly exposed to the hot fluids within or exiting a combustion chamber 26. The thermally conductive alloy has a thermal conductivity of about 135 BTU*in$^2$/ft$^2$*h*° F. to about 175 BTU*in$^2$/ft$^2$*h*° F. Heat from the hot fluids is conducted through the first high temperature performance metallic strip 28 to the first non-metallic filler strip 32. At temperatures great than 1000° F., the thermally conductive alloy maintains excellent strength and sealing capability better than stainless steel. However, the mechanical properties of the thermally conductive alloy may begin to deteriorate at temperatures great than 1000° F. Accordingly, the first high temperature performance metallic strip 28 formed of the first thermally conductive alloy is disposed along the central opening 46, as shown in FIG. 1, and is typically exposed to a chamber 26 and hot fluids, as shown in FIG. 10. Thus, the first high temperature performance metallic strip 28 at least partially shields the second high temperature performance metallic strip 36 from the hot fluids of the chamber 26 or conduit.

Figure 12B:
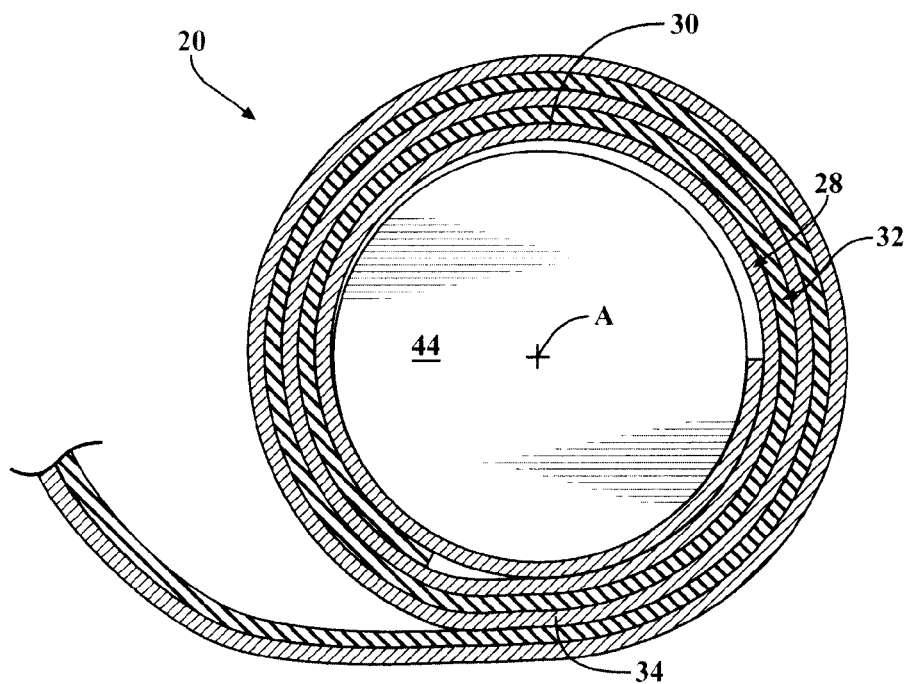

The method of forming the spiral wound gasket 20 next includes winding the first non-metallic filler strip 32 spirally around the central axis A outwardly of the first high temperature performance metallic winding 30 to present a first non-metallic filler winding 34, as shown in FIG. 12B. In one embodiment, the first non-metallic filler strip 32 is a coating disposed on the first high temperature performance metallic strip 28. The coating can vary in thickness, but typically has a thickness less than the thickness of the metallic strips 28, 36. In one embodiment, the coating has a thickness of about 25.0 μm. The metallic strips 28, 36 typically have a thickness greater than 25.0 μm. The coating is applied to at least one of the outer and inner surface of the first high temperature performance metallic strip 28. The method includes applying the coating to the high temperature performance metallic strips 28, either before or during the winding process.

Figure 6:
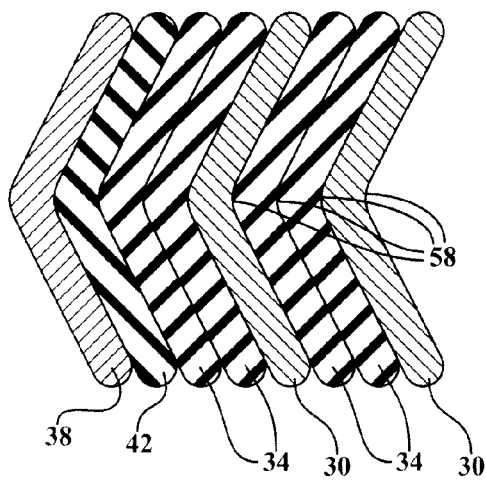
FIG. 6 is an enlarged cross sectional view of a sixth embodiment of the spiral wound gasket.

The first non-metallic filler strip 32 is disposed on the first high temperature performance metallic winding 30 being most inward, i.e., on the first high temperature performance metallic winding 30 closest to the central axis A. The spiral wound gasket 20 may include a single first non-metallic filler winding 34, as shown in FIG. 2. However, the first non-metallic filler strip 32 is typically spirally wound around itself to present a plurality of first non-metallic filler windings 34, and each first non-metallic filler winding 34 is interposed between adjacent first high temperature performance metallic windings 30, as shown in FIGS. 1 and 1A. Each first non-metallic filler winding 34 is disposed outwardly of one of the first high temperature performance metallic windings 30 to provide a backing to the first high temperature performance metallic winding 30. In one embodiment, shown in FIG. 12B, the first high temperature performance metallic strip 28 is wound one winding around the central axis A and then one partial winding around itself, before the first non-metallic filler strip 32 is wound. In another embodiment, shown in FIG. 6, the spiral wound gasket 20 may include a plurality of first non-metallic filler windings 34 between each first high temperature performance metallic winding 30. In yet another embodiment, shown in FIG. 7, the spiral wound gasket 20 includes a plurality of first high temperature performance metallic windings 30 on each side of the first non-metallic filler winding 34.

The first insulating material of the first non-metallic filler strip 32 has a lower thermal conductivity than the thermally conductive metallic alloy. The first non-metallic insulating material is preferably mica, which has a thermal conductivity of about 4.0 BTU*in$^2$/ft$^2$*h*° F. to about 6.0 BTU*in$^2$/ft$^2$*h*° F. However, the first non-metallic insulating material may be graphite or another material having a lower thermal conductivity than the thermally conductive metallic alloy. As stated above, the first non-metallic filler strip 32 can be a coating, which is also formed of the first insulating material having a lower thermal conductivity than the thermally conductive metallic alloy.

The first non-metallic insulating material retards the radial dissipation of the heat conducted by the first high temperature performance metallic strip 28 allowing the first high temperature performance metallic strip 28 to conduct more of the heat to the first joint member 22 and second joint member 24, than would be the case if the first non-metallic insulating material was a metallic material. The first non-metallic filler strip 32 formed of the first non-metallic insulating material reduces the heat transferred between the adjacent first high temperature performance metallic windings 30 and also from the first high temperature performance metallic strip 28 to the second high temperature performance metallic strip 36. The combination of the first high temperature performance metallic winding 30 backed by the first non-metallic filler winding 34 protects the second high temperature performance metallic winding 38 from thermal degradation of its mechanical properties or thermal creep (relaxation) and second non-metallic filler windings 42 from the hot fluids of the chamber 26 or conduit.

Figure 12C:
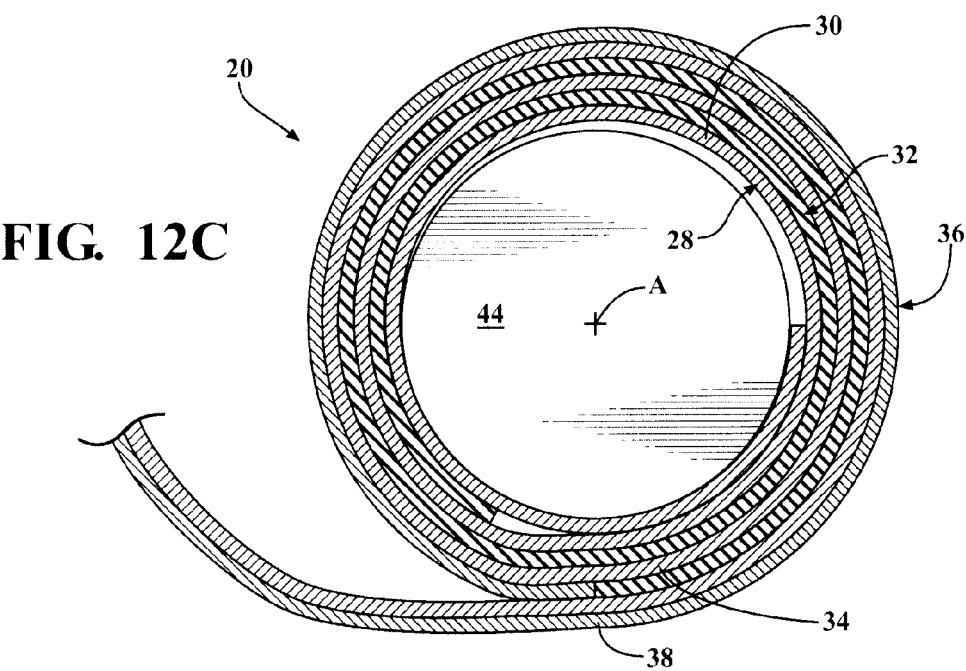

The method of forming the spiral wound gasket 20 next includes winding the second high temperature performance metallic strip 36 around the central axis A outwardly of the first high temperature performance metallic windings 30 and the first non-metallic filler windings 34 to present a second high temperature performance metallic winding 38, as shown in FIG. 12C. The second high temperature performance metallic strip 36 is disposed on the outermost of the first high temperature performance metallic windings 30 and the first non-metallic filler windings 34, i.e., the first high temperature performance metallic winding 30 or the first non-metallic filler winding 34 farthest from the central axis A. A first non-metallic filler winding 34 may back each of the first high temperature performance metallic windings 30, in which case the second high temperature performance metallic strip 36 is disposed on the outermost first non-metallic filler winding 34. However, the outermost first high temperature performance metallic winding 30 may not be backed by one of the first non-metallic filler windings 34, as shown in FIG. 1A, in which case the second high temperature performance metallic strip 36 is disposed on the outermost first high temperature performance metallic winding 30. The spiral wound gasket 20 may include a single second high temperature performance metallic winding 38, as shown in FIG. 2. However, the second high temperature performance metallic strip 36 is typically spirally wound around itself to present a plurality of second high temperature performance metallic windings 38, as shown in FIGS. 1 and 1A. In one embodiment, shown in FIGS. 1 and 1A, the second high temperature performance metallic winding 38 is the outermost winding of the entire spiral wound gasket 20.

The second high temperature performance metallic strip 36 is formed of a stainless steel material having a lower thermal conductivity than the thermal conductivity of the thermally conductive alloy, and a higher thermal conductivity than the non-metallic insulating materials. In one embodiment, the second high temperature performance metallic strip 36 is formed of a stainless steel material having a thermal conductivity of 120 BTU*in$^2$/ft$^2$*h*° F. to 135 BTU*in$^2$/ft$^2$*h*° F. The stainless steel material may include a variety of compositions known in the art. In one embodiment, the stainless steel material is Stainless Steel 301 or Stainless Steel 316, which are commercial available products. The combination of the first high temperature performance metallic strip 28 and the first non-metallic filler strip 32 protects the second high temperature performance metallic strip 36 from the high temperature environment of the chamber 26 and allows the second high temperature performance metallic strip 36 to maintain its strength and ability to seal at temperatures of about 1000° F. to about 1600° F.

Figure 12D:
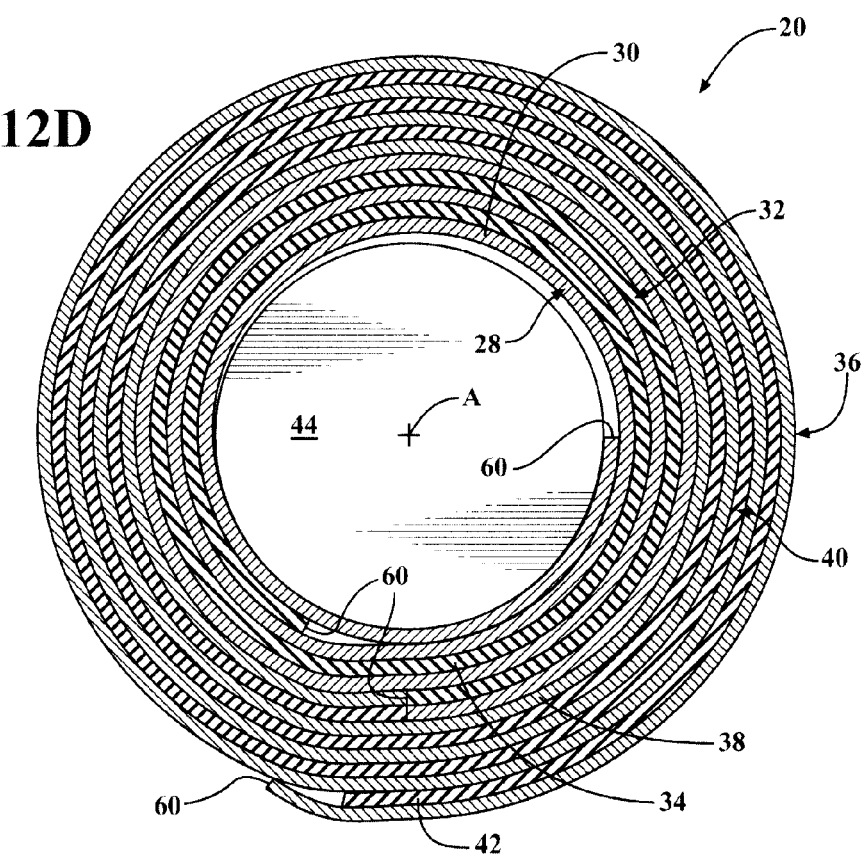

As shown in FIG. 12D, the method of forming the spiral wound gasket 20 next includes winding the second non-metallic filler strip 40 spirally around the central axis A outwardly of the second high temperature performance metallic winding 38 to present a second non-metallic filler winding 42, as shown in FIG. 12D. In one embodiment, the second non-metallic filler strip 40 is a coating disposed on the second high temperature performance metallic strip 30. The coating can vary in thickness, but typically has a thickness less than the thickness of the metallic strips 28, 36. In one embodiment, the coating has a thickness of about 25.0 µm. The metallic strips 28, 36 typically have a thickness greater than 25.0 µm. The coating is applied to at least one of the outer and inner surface of the second high temperature performance metallic strip 30. The method includes applying the coating to the second high temperature performance metallic strip 30, either before or during the winding process.

Figure 8:
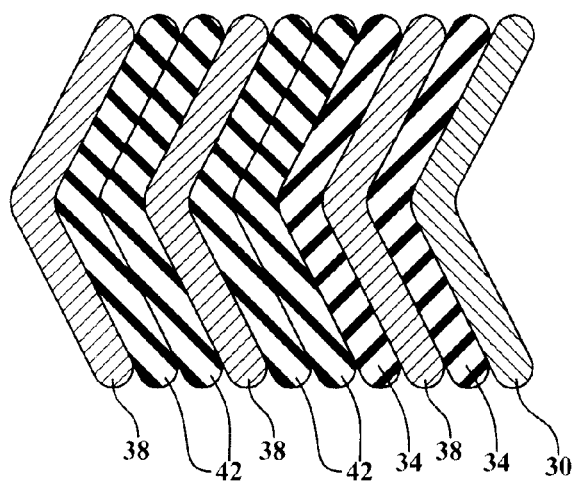
FIG. 8 is an enlarged cross sectional view of an eighth embodiment of the spiral wound gasket.
Figure 9:
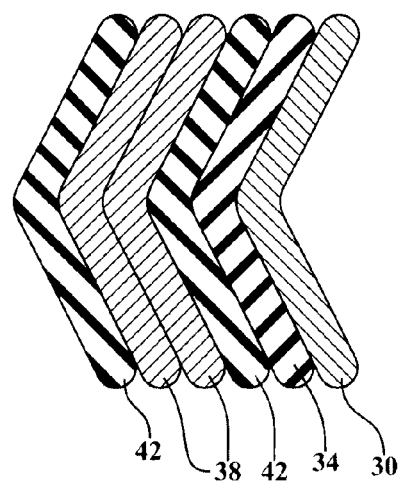
FIG. 9 is an enlarged cross sectional view of a ninth embodiment of the spiral wound gasket.

The second non-metallic filler strip 40 is disposed on the second high temperature performance metallic winding 38 being most inward, i.e., the second high temperature performance metallic winding 38 closest to the central axis A. The spiral wound gasket 20 may include a single second non-metallic filler winding 42, as shown in FIG. 2. However, the second non-metallic filler strip 40 is typically spirally wound around itself to present a plurality of second non-metallic filler windings 42, and each second non-metallic filler winding 42 is interposed between two adjacent second high temperature performance metallic windings 38, as shown in FIGS. 1 and 1A. Each second non-metallic filler winding 42 is disposed outwardly of one of the second high temperature performance metallic windings 38 to provide a backing to the second high temperature performance metallic winding 38. In one embodiment, the second high temperature performance metallic strip 36 is wound one time around the central axis A before the second non-metallic filler strip 40 is wound. In another embodiment, shown in FIG. 8, the spiral wound gasket 20 includes a plurality of second non-metallic filler windings 42 between each second high temperature performance metallic winding 38. In yet another embodiment, shown in FIG. 9, the spiral wound gasket 20 includes a plurality of second high temperature performance metallic windings 38 on each side of the second non-metallic filler winding 42.

Figure 4:
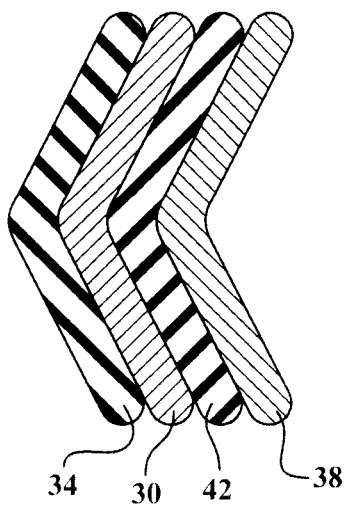
FIG. 4 is an enlarged cross sectional view of a fourth embodiment of the spiral wound gasket.

The second non-metallic filler strip 40 is formed of the second non-metallic insulating material having a lower thermal conductivity than the thermal conductivity of the thermally conductive alloy and the stainless steel. The second non-metallic insulating material is preferably graphite, which has a thermal conductivity of about 39 BTU*in$^2$/ft$^2$*h*° F. to about 45 BTU*in$^2$/ft$^2$*h*° F. However, the second non-metallic insulating material may be mica or another material. In some embodiments, as shown in FIGS. 3 and 4, the second non-metallic insulating material is formed of the same material as the first non-metallic insulating material. The second non-metallic insulating material retards the radial dissipation of the heat conducted by the second high temperature performance metallic strip 36 allowing the second high temperature performance strip 36 to conduct more heat to the first joint member 22 and the second joint member 24 than would be the case if the non-metallic insulating material was a metallic material. The second non-metallic filler strip 40 reduces the heat transferred between the adjacent second high temperature performance metallic windings 38. As stated above, the second non-metallic filler strip 40 can be a coating, which is also formed of the first insulating material having a lower thermal conductivity than the thermally conductive metallic alloy.

As alluded to above, the spiral wound gasket 20, particularly the high temperature performance metallic strips, provides a sealing force along a cylindrical body containing high temperature fluids flowing therethrough. The cylindrical body typically includes a gap 48 between the first joint member 22 and the second joint member 24, with the spiral wound gasket 20 disposed in the gap 48. While the high temperature performance metallic strips 30, 36 provide the sealing force, the non-metallic filler strips 28, 40 control heat transfer and also flow into discontinuities (scratches, machine marks, lines, etc) of surfaces of the joint members 22, 24 to provide a micro-seal between the non-metallic filler strips 28, 40 and the joint members 22, 24. The micro seal prevents hot fluids from leaking past the edges of the windings 30, 34, 38, 42 via the discontinuities of the joint members 22, 24.

As shown in FIG. 10, the second joint member 24 is disposed along and spaced from the first joint member 22 to present the gap 48 therebetween. The gap 48 between the joint members 22, 24 extends along the chamber 26 wherein the hot fluids flow therethrough. The joint members 22, 24 are formed of a metal material and typically include a flange 50, as shown in FIG. 10. The spiral wound gasket 20 is disposed along the gap 48 between the first joint member 22 and second joint member 24 to seal the gap 48. As alluded to above, the spiral wound gasket 20 can also seal other types of cylindrical bodies, such as a conduit, a valve exiting the internal combustion chamber, or another high temperature fluid application.

The spiral wound gasket 20 provides excellent flexibility and sealing capability. The spiral wound gasket 20 is highly effective in preventing gases or hot fluids flowing through the chamber 26 or conduit from escaping through the gap 48 between the joint members 22, 24. In addition, the spiral wound gasket maintains excellent strength and sealing capability when directly exposed to high pressure variations, thermal cycling, and hot fluids at temperatures of about 1000° F. to about 1600° F. The first high temperature performance metallic strip and first non-metallic filler strip protects the second high temperature performance metallic strip and second non-metallic filler strip from the hot fluids. It is not necessary to include the U-shaped groove in the fluid joint member for protecting the spiral wound gasket 20 from the hot fluids, so the joint members are less costly to manufacture. The spiral wound gasket 20 provides lower manufacturing costs of the joint members 22, 24, compared to the spiral wound gaskets 20 of the prior art The strength and sealing capability of the spiral wound gasket 20 of FIG. 1 was tested and compared to a spiral wound gasket of the prior art including stainless steel and graphite strips. The spiral wound gaskets 20 were exposed to a temperature of about 1200° F. for about ten hours. After ten hours, the spiral wound gasket 20 of FIG. 1 maintained excellent strength, sealing capability, and showed no sign of deterioration. After ten hours, the spiral wound gasket of the prior art began to deteriorate.

Typically, the first joint member 22 and the second joint member 24 have a cylindrical shape and extend around the chamber 26 also having a cylindrical shape. The flanges 50 of the joint members 22, 24 each present a face 54 extending parallel to one another along the gap 48. The faces 54 are machined flat with a pointed or chip holding tool. In one embodiment, the second joint member 24 includes a shelf 56 having an L-shaped cross section for maintaining the spiral wound gasket 20, as shown in FIG. 10. The L-shaped shelf 56 extends along the gap 48 between the joint members 22, 24 and around the chamber 26. The L-shape shelf 56 extends around the edge of the second joint member 24 adjacent the chamber 26 and the first joint member 22. The L-shaped shelf 56 can be formed by cutting into the second joint member 24 using the same pointed or chip holding tool as is used to machine the faces 54. The joint members 22, 24 including the L-shaped shelf 56 are less costly and easier to manufacture than the prior art joint members 22, 24 having the U-shaped grooves 52, which typically require a second machining operation with a differently shaped tool than used during the first machining operation.

The spiral wound gasket 20 is disposed on the L-shaped shelf 56 of the second joint member 24 so that central opening 46 of the spiral wound gasket 20 is disposed along the chamber 26 and the first high temperature performance metallic strip 28 is exposed to the hot fluids at temperatures of about 1000° F. to about 1600° F. The first high temperature performance metallic strip 28 protects the second high temperature performance metallic strip 36 and non-metallic filler strips 32, 40 from the hot fluids and harsh environment of the chamber 26.

As alluded to above, spiral wound gaskets are typically profiled longitudinally to provide a degree of controlled axial compression. Prior to winding each of the strips 28, 32, 36, 40, the method can include forming at least one indentation 58, such as a crease, extending lengthwise and centrally along each of the strips 28, 32, 36, 40. The step of forming the indentation 58 may include stamping, pressing, or another method. In the final spiral wound gasket 20, each of the windings 30, 34, 38, 42 are aligned axially around the central axis A and include the indentation 58, as shown in FIGS. 1, 1A, and 2, rendering the strips 28, 32, 36, 40 spring compressible along the center axis. The windings 30, 34, 38, 42 act as springs and provide the sealing force between the joint members 22, 24. In another embodiment, the strips 28, 32, 36, 40 include an indentation 58 having another shape, such as a plurality of recesses, to further stiffen each metallic winding and increase the force available from each wrap. In such an embodiment, the non-metallic filler windings 38, 42 flow to fill the gap between the metallic windings 30, 34 during the winding process, such that the metallic windings 30, 34 are nested in essentially the same manner as in the above case of a simple crease.

The number of windings 30, 34, 38, 42 of each of the strips 28, 32, 36, 40 of the spiral wound gasket 20 depends on the size of the gap 48 between the joint members 22, 24. For example, if the gap 48 is small, then the spiral wound gasket 20 may include one winding of each of the strips 28, 32, 36, 40, as shown in FIGS. 2-5. If the gap 48 is larger, then the spiral wound gasket 20 may include several windings 30, 34, 38, 42 of each of the strips 28, 32, 36, 40, as shown in FIGS. 1 and 1A. The number of windings 30, 34, 38, 42 also depends on the load required to seal the gap 48 between the joint members 22, 24. Typically, each of the strips 28, 32, 36, 40 is spirally wound around itself to provide a plurality of windings 30, 34, 38, 42. As stated above, the windings 30, 34, 38, 42 act as a spring to provide the sealing force, so the greater the load required to seal the gap 48, the more windings 30, 34, 38, 42 are included.

Figure 5:
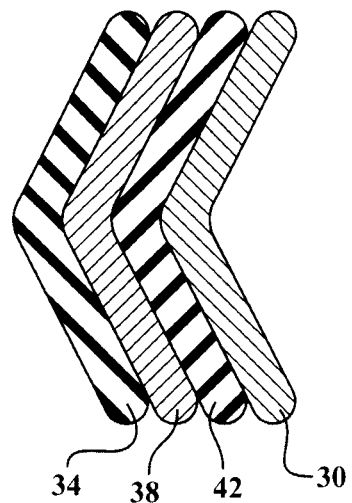
FIG. 5 is an enlarged cross sectional view of a fifth embodiment of the spiral wound gasket.

In an alternate embodiment, the first high temperature performance metallic winding 30 is disposed outwardly of the second high temperature performance winding 34, as shown in FIGS. 3 and 4. In yet another alternate embodiment, the first non-metallic filler winding 38 is disposed outwardly of the second non-metallic filler winding, as shown in FIGS. 4 and 5.

The method of forming the spiral wound gasket 20 also includes welding each of the strips 28, 32, 36, 40 to the adjacent strips 28, 32, 36, 40. The spiral wound gasket 20 may include welds 60 at the innermost and outermost winding of each of the strips 28, 32, 36, 40. The spiral wound gasket 20 may also include welds 60 at the end of a plurality of windings 30, 34, 38, 42 of the strips 28, 32, 36, 40, as shown in FIG. 1A. For example, the first high temperature performance metallic windings 30 may be welded to one another before the first non-metallic filler strip 32 is wound.

Obviously, many modifications and variations of the present invention are possible in light of the above teachings and may be practiced otherwise than as specifically described while within the scope of the appended claims.

The invention claimed is:

1. A method of sealing a gap (48) between joint members (22, 24) of a fluid joint exposed high temperature fluids comprising the steps of:
winding a first high temperature performance metallic strip (28) formed of a thermally conductive alloy including, in wt % of the alloy, nickel (Ni) in an amount of 18.0 wt % to 55.0 wt %; chromium (Cr) in an amount of 13.5 wt % to 23.0 wt %; and a balance of iron (Fe) spirally around a central axis (A) to present a first high temperature performance metallic winding (30) surrounding a center opening;
winding a first non-metallic filler strip (32) spirally around the central axis (A) outwardly of the first high temperature performance metallic winding (30) to form a first non-metallic filler winding (34);
winding a second high temperature performance metallic strip (36) formed of a stainless steel material around the central axis (A) outwardly of the first non-metallic filler winding (34), the material of said second high temperature performance metallic strip is different from the material of said first high temperature performance metallic strip;
winding a second non-metallic filler strip (40) formed of a second non-metallic insulating material spirally around the central axis (A) outwardly of the second high temperature performance metallic winding (38) to form a spiral wound gasket (20);
disposing a first joint member (22) formed of a metal material along a chamber (26) for containing high temperature fluids;
disposing a second joint member (24) formed of a metal material along the chamber (26);
spacing the second joint member (24) from the first joint member (22) to present a gap (48) therebetween; and
disposing the spiral wound gasket (20) along the gap (48) between the joint members (22, 24) for sealing said gap (48).

2. A method as set forth in claim 1 including disposing said first high temperature performance metallic winding (30) along the gap (48) between the first joint member (22) and the second joint member (24) so that the first non-metallic filler strip (32) is exposed to the chamber (26) for containing the high temperature fluids.

3. A method as set forth in claim 1 including forming a groove (52) in the second joint member (24) having an L-shaped cross section and extending along the gap (48) and the chamber (26) and disposing the spiral wound gasket (20) in the groove (52).

4. A spiral wound gasket (20) comprising:
a first high temperature performance metallic strip (28) formed of a thermally conductive alloy including, in wt % of said alloy, nickel (Ni) in an amount of about 18.0 wt % to about 55.0 wt %; chromium (Cr) in an amount of about 13.5 wt % to about 23.0 wt %; and a balance of iron (Fe);
said first high temperature performance metallic strip (28) being wound around a central axis (A) to present a first high temperature performance metallic winding (30);
a first non-metallic filler strip (32) formed of a first non-metallic insulating material disposed outwardly of said first high temperature performance metallic winding (30) and wound around said central axis (A) to present a first non-metallic filler winding (34);
a second high temperature performance metallic strip (36) formed of a stainless steel material disposed outwardly of said first non-metallic filler winding (34) and wound around said central axis (A) to present a second high temperature performance metallic winding (38), the material of said second high temperature performance metallic strip is different from the material of said first high temperature performance metallic strip; and
a second non-metallic filler strip (40) formed of a second non-metallic insulating material disposed outwardly of said second high temperature performance metallic winding (38) and wound around said central axis (A) to present a second non-metallic filler winding (42).

5. A spiral wound gasket (20) as set forth in claim 4 wherein said first high temperature performance metallic strip (28) is spirally wound around itself to present a plurality of said first high temperature performance metallic windings (30) and one of said first non-metallic filler windings (34) is interposed between adjacent first high temperature performance metallic windings (30).

6. A spiral wound gasket (20) as set forth in claim 4 wherein said second high temperature performance metallic strip (36) is spirally wound around itself to present a plurality of said second high temperature performance metallic windings (38) and one of said second non-metallic filler windings (42) is interposed between adjacent second high temperature performance metallic windings (38).

7. A spiral wound gasket (20) as set forth in claim 4 wherein each of said strips (28, 32, 36, 40) are aligned axially around said center axis and include an indentation (58) extending lengthwise therealong rendering said strips (28, 32, 36, 40) compressible along said central axis (A).

8. A spiral wound gasket (20) as set forth in claim 4 wherein at least one of said non-metallic filler strips (32, 40) is a coating having a thickness of less than 25.0 µm on at least one of said high temperature performance metallic strips (36, 40).

9. A spiral wound gasket (20) as set forth in claim 4 wherein said each of said non-metallic insulating material of said non-metallic filler strips (32, 40) includes at least one of mica and graphite.

10. A spiral wound gasket (20) as set forth in claim 9 wherein said first non-metallic insulating material includes mica and said second non-metallic insulating material includes graphite.

11. A spiral wound gasket (20) as set forth in claim 4 wherein each of said strips (28, 32, 36, 40) are spirally wound around itself so that each of the strips (28, 32, 36, 40) presents a plurality of windings (30, 34, 38, 42).

12. A spiral wound gasket (20) as set forth in claim 4 including a plurality of welds (60) for welding each of said strips (28, 32, 36, 40) to an adjacent one of said strips (28, 32, 36, 40).

13. A spiral wound gasket (20) as set forth in claim 4 wherein said thermally conductive alloy includes said nickel in an amount of about 18.0 wt % to about 22.0 wt % and said chromium in an amount of about 18.0 wt % to about 22.0 wt %.

14. A spiral wound gasket (20) as set forth in claim 4 wherein said thermally conductive alloy includes said nickel in an amount of about 26.0 wt % to about 28.0 wt % and chromium in an amount of about 20.5 wt % to about 23.0 wt %.

15. A spiral wound gasket (20) as set forth in claim 4 wherein said thermally conductive alloy includes said nickel in an amount of about 24.0 wt % to about 27.0 wt % and chromium in an amount of about 13.5 wt % to about 16.0 wt %.

16. A spiral wound gasket (20) as set forth in claim 4 wherein said thermally conductive alloy includes a combination of said nickel and cobalt in an amount of about 50.0 wt % to about 55.0 wt % and said chromium in an amount of about 17.1 wt % to about 21.0 wt %.

17. A spiral wound gasket (20) as set forth in claim 4 wherein said thermally conductive alloy includes at least one of
carbon in an amount up to 0.08 wt %;
manganese in an amount up to 3.0 wt %;
sulfur in an amount up to 0.015 wt %;
phosphorous in an amount up to 0.03 wt %;
silicon up to 1.0 wt %;
molybdenum in an amount of 1.0 wt % to 8.0 wt %;
nitrogen in an amount of 0.30 wt % to 0.40 wt %;
titanium in an amount of up to 2.30 wt %;
vanadium in an amount of 0.10 wt % to 0.50 wt %;
aluminum in am amount up to 0.80 wt %;
and boron in an amount of 0.001 wt % to 0.010 wt %;
cobalt in an amount up to 1.0 wt %;
a combination of niobium and tantalum in an amount of about 4.75 to 5.50 wt %; and
copper in an amount up to 1.50.

18. A spiral wound gasket (20) as set forth in claim 4 wherein each of said high temperature performance metallic strips (28, 36) have a thermal conductivity and said thermal conductivity of said first high temperature performance metallic strip (28) is greater than said thermal conductivity of said second high temperature performance metallic strip (36).

19. A spiral wound gasket (20) as set forth in claim 4 wherein each of said strips (28, 32, 36, 40) have a thermal conductivity and said thermal conductivity of said high temperature performance metallic strips (28, 36) is greater than said thermal conductivities of said non-metallic filler strips (32, 40).

20. A spiral wound gasket (20) comprising:
a first high temperature performance metallic strip (28) formed of a thermally conductive alloy including, in wt % of said alloy, nickel (Ni) in an amount of 18.0 wt % to 55.0 wt %;
chromium (Cr) in an amount of 13.5 wt % to 23.0 wt %; and a balance of iron (Fe);
said first high temperature performance metallic strip (28) being spirally wound around a central axis (A) and itself to present a plurality of first high temperature performance metallic windings (30) surrounding a central opening (46);
a first non-metallic filler strip (32) formed of a first non-metallic insulating material disposed outwardly of one of said first high temperature performance metallic windings (30);
said first non-metallic insulating material of said first non-metallic filler strip (32) including mica;
said first non-metallic filler strip (32) being spirally wound around said central axis (A) to present a plurality of first non-metallic filler windings (34) interposed between adjacent first high temperature performance metallic windings (30);
a second high temperature performance metallic strip (36) formed of a stainless steel material disposed outwardly of said first high temperature performance metallic windings (30) and said first non-metallic filler windings (34);

said second high temperature performance metallic strip (36) being spirally wound around said central axis (A) to present a plurality of second high temperature performance metallic windings (38);
a second non-metallic filler strip (40) formed of a second non-metallic insulating material disposed outwardly of one of said second high temperature performance metallic windings (38), the material of said second high temperature performance metallic strip is different from the material of said first high temperature performance metallic strip;
said second non-metallic filler strip (40) being spirally wound around said central axis (A) to present a plurality of second non-metallic filler windings (42) interposed between adjacent second high temperature performance metallic windings (38); and
said second non-metallic insulating material of said second non-metallic filler strip (40) including graphite.

21. A sealed assembly for containing high temperature fluids comprising:
a cylindrical body for containing high temperature fluids; a spiral wound gasket (20) disposed along said cylindrical body;
said spiral wound gasket (20) including a first high temperature performance metallic strip (28) formed of a thermally conductive alloy;
said thermally conductive alloy including, in wt % of said alloy, nickel (Ni) in an amount of about 18.0 wt % to about 55.0 wt %; chromium (Cr) in an amount of about 13.5 wt % to about 23.0 wt %; and a balance of iron (Fe);
said first high temperature performance metallic strip (28) being wound around a central axis (A) to present a first high temperature performance metallic winding (30);
said first high temperature performance metallic winding (30) being disposed along said gap (48) between said first joint member (22) and said second joint member (24) and exposed to said chamber (26) for containing the high temperature fluids;
a first non-metallic filler strip (32) formed of a first non-metallic insulating material disposed outwardly of said first high temperature performance metallic winding (30) and wound around said central axis (A) to present a first non-metallic filler winding (34);
a second high temperature performance metallic strip (36) formed of a stainless steel material disposed outwardly of said first non-metallic filler winding (34) and wound around said central axis (A) to present a second high temperature performance metallic winding (38), the material of said second high temperature performance metallic strip is different from the material of said first high temperature performance metallic strip; and
a second non-metallic filler strip (40) formed of a second non-metallic insulating material disposed outwardly of said second high temperature performance metallic winding (38) and wound around said central axis (A) to present a second non-metallic filler winding (42).

22. A sealed assembly as set forth in claim 21 wherein said cylindrical body includes a first joint member (22) formed of a metal material and extending along a chamber (26) for containing high temperature fluids;
a second joint member (24) formed of a metal material extending along said chamber (26) and spaced from said first joint member (22) to present a gap (48) therebetween;
said gap (48) between said joint members (22, 24) extending along said chamber (26); and
said spiral wound gasket (20) disposed along said gap (48).

23. A sealed assembly as set forth in claim 22 including a micro-seal between the non-metallic filler strips 28, 40 and the joint members 22, 24 to prevent fluids from leaking past the windings 30, 34, 38, 42 via discontinuities of the joint members 22, 24.

24. A sealed assembly as set forth in claim 22 wherein said second joint member (24) includes a groove (52) having an L-shaped cross section extending along said gap (48) and said spiral wound gasket (20) being disposed in said groove (52).

25. A method of forming a spiral wound gasket (20) comprising:
   winding a first high temperature performance metallic strip (28) formed of a thermally conductive alloy including, in wt % of the alloy, nickel (Ni) in an amount of 18.0 wt % to 55.0 wt %; chromium (Cr) in an amount of 13.5 wt % to 23.0 wt %; and a balance of iron (Fe) spirally around a central axis (A) to present a first high temperature performance metallic winding (30);
   winding a first non-metallic filler strip (32) spirally around the central axis (A) outwardly of the first high temperature performance metallic winding (30) to present a first non-metallic filler winding (34);
   winding a second high temperature performance metallic strip (36) formed of a stainless steel material around the central axis (A) outwardly of the first non-metallic filler winding (34) to present a second high temperature performance metallic winding (38), the material of said second high temperature performance metallic strip is different from the material of said first high temperature performance metallic strip; and
   winding a second non-metallic filler strip (40) formed of a second non-metallic insulating material spirally around the central axis (A) outwardly of the second high temperature performance metallic winding (38).

26. A method as set forth in claim 25 including winding the first high temperature performance metallic strip (28) spirally around itself to present a plurality of first high temperature performance metallic windings (30).

27. A method as set forth in claim 26 including interposing the first non-metallic filler winding (34) between adjacent first high temperature performance metallic windings (30).

28. A method as set forth in claim 25 including winding the second high temperature performance metallic strip (36) spirally around itself to present a plurality of second high temperature performance metallic windings (38).

29. A method as set forth in claim 28 including interposing the second non-metallic filler winding (42) between adjacent second high temperature performance metallic windings (38).

30. A method as set forth in claim 25 including forming an indentation (58) extending along each of the strips (28, 32, 36, 40).

31. A method as set forth in claim 25 including winding each of said strips (28, 32, 36, 40) spirally around the central axis (A) to present a plurality of windings (30, 34, 38, 42).

32. A method as set forth in claim 25 including welding each of said strips (28, 32, 36, 40) to an adjacent one of said strips (28, 32, 36, 40).

* * * * *